US012739662B2

(12) United States Patent
Säily et al.

(10) Patent No.: US 12,739,662 B2
(45) Date of Patent: Sep. 15, 2026

(54) MEASUREMENT CONFIGURATION FOR LOCAL AREA MACHINE LEARNING RADIO RESOURCE MANAGEMENT

(71) Applicant: Nokia Technologies Oy, Espoo (FI)

(72) Inventors: Mikko Säily, Laukkoski (FI); Teemu Mikael Veijalainen, Helsinki (FI)

(73) Assignee: Nokia Technologies Oy, Espoo (FI)

( * ) Notice: Subject to any disclaimer, the term of this patent is extended or adjusted under 35 U.S.C. 154(b) by 765 days.

(21) Appl. No.: 17/997,187

(22) PCT Filed: Apr. 21, 2021

(86) PCT No.: PCT/IB2021/053303

§ 371 (c)(1),
(2) Date: Oct. 26, 2022

(87) PCT Pub. No.: WO2021/224705

PCT Pub. Date: Nov. 11, 2021

(65) Prior Publication Data

US 2023/0269606 A1 Aug. 24, 2023

Related U.S. Application Data

(60) Provisional application No. 63/020,466, filed on May 5, 2020.

(51) Int. Cl.
*H04W 24/02* (2009.01)
*H04W 24/10* (2009.01)

(52) U.S. Cl.
CPC .......... *H04W 24/02* (2013.01); *H04W 24/10* (2013.01)

(58) Field of Classification Search
CPC .............................. H04W 24/02; H04W 24/10
See application file for complete search history.

(56) References Cited

U.S. PATENT DOCUMENTS

| | | | | |
|---|---|---|---|---|
| 10,039,016 | B1 | 7/2018 | Larish et al. | |
| 10,367,677 | B2 * | 7/2019 | Parkvall | H04W 52/0251 |
| 11,523,404 | B2 * | 12/2022 | Garg | H04W 72/569 |
| 2012/0132947 | A1 | 5/2012 | Kraeuter | |

(Continued)

FOREIGN PATENT DOCUMENTS

| | | |
|---|---|---|
| WO | 2019/029802 A1 | 2/2019 |
| WO | 2019/172813 A1 | 9/2019 |
| WO | 2020/080989 A1 | 4/2020 |

OTHER PUBLICATIONS

"3rd Generation Partnership Project; Technical Specification Group Radio Access Network; Evolved Universal Terrestrial Radio Access (E-UTRA); Radio Resource Control (RRC); Protocol specification (Release 15)", 3GPP TS 36.331, V15.8.0, Dec. 2019, pp. 1-964.

(Continued)

*Primary Examiner* — David Bilodeau
(74) *Attorney, Agent, or Firm* — Lippes Mathias LLP

(57) ABSTRACT

A method, apparatus, and a computer-readable storage medium are provided for a machine learning (ML) model based radio resource management. In one example embodiment, the method may include a network node defining a validity area and a measurement group for at least a ML model for one or more user equipments and transmitting the validity area and the measurement group of the at least one ML model to the user equipment.

20 Claims, 8 Drawing Sheets

(56) References Cited

U.S. PATENT DOCUMENTS

| | | | | |
|---|---|---|---|---|
| 2017/0026888 | A1 | 1/2017 | Kwan | |
| 2017/0331577 | A1* | 11/2017 | Parkvall | H04W 8/18 |
| 2020/0396632 | A1* | 12/2020 | Ramachandra | H04B 17/309 |
| 2021/0352609 | A1* | 11/2021 | Kiefer | H04W 64/003 |
| 2022/0046385 | A1* | 2/2022 | Sundararajan | H04W 24/10 |
| 2023/0057661 | A1* | 2/2023 | Awoniyi-Oteri | H04W 24/08 |
| 2023/0180039 | A1* | 6/2023 | Zhohov | H03M 7/6041 370/328 |
| 2023/0189022 | A1* | 6/2023 | Ramachandra | H04W 24/02 370/329 |

OTHER PUBLICATIONS

"3rd Generation Partnership Project; Technical Specification Group Radio Access Network; NR; Radio Resource Control (RRC) protocol specification (Release 15)", 3GPP TS 38.331, V15.8.0, Dec. 2019, pp. 1-532.

"3rd Generation Partnership Project; Technical Specification Group Radio Access Network; Evolved Universal Terrestrial Radio Access (E-UTRA) and Evolved Universal Terrestrial Radio Access Network (E-UTRAN); Overall description; Stage 2 (Release 16)", 3GPP TS 36.300, V16.0.0, Dec. 2019, pp. 1-366.

"3rd Generation Partnership Project; Technical Specification Group Radio Access Network; NR; NR and NG-RAN Overall Description; Stage 2 (Release 16)", 3GPP TS 38.300, V16.0.0, Dec. 2019, pp. 1-101.

International Search Report and Written Opinion received for corresponding Patent Cooperation Treaty Application No. PCT/IB2021/053303, dated Jun. 29, 2021, 16 pages.

Office Action received for corresponding Japanese Patent Application No. 2022-567389, dated Nov. 7, 2023, 3 pages of Office Action and 1 page of summary available.

Notice of Allowance received for corresponding Japanese Patent Application No. 2022-567389, dated May 7, 2024, 2 pages of Notice of Allowance and no page of translation available.

Office action received for corresponding European Patent Application No. 21721633.2, dated Nov. 12, 2025, 4 pages.

* cited by examiner

MEASUREMENT CONFIGURATION FOR LOCAL AREA MACHINE LEARNING RADIO RESOURCE MANAGEMENT

RELATED APPLICATION

This application claims priority to PCT Application No. PCT/IB2021/053303, filed on Apr. 21, 2021, which claims priority to U.S. Provisional Application No. 63/020,466, filed on May 5, 2020, each of which is incorporated herein by reference in its entirety.

CROSS-REFERENCE TO RELATED APPLICATIONS

This application claims priority to U.S. provisional application No. 63/020,466, filed May 5, 2020, entitled "MEASUREMENT CONFIGURATION FOR LOCAL AREA MACHINE LEARNING RADIO RESOURCE MANAGEMENT", the disclosure of which is hereby incorporated by reference herein in its entirety.

TECHNICAL FIELD

This description relates to wireless communications, and in particular, machine learning based radio resource management.

BACKGROUND

A communication system may be a facility that enables communication between two or more nodes or devices, such as fixed or mobile communication devices. Signals can be carried on wired or wireless carriers.

An example of a cellular communication system is an architecture that is being standardized by the 3rd Generation Partnership Project (3GPP). A recent development in this field is often referred to as the long-term evolution (LTE) of the Universal Mobile Telecommunications System (UMTS) radio-access technology. E-UTRA (evolved UMTS Terrestrial Radio Access) is the air interface of 3GPP's Long Term Evolution (LTE) upgrade path for mobile networks. In LTE, base stations or access points (APs), which are referred to as enhanced Node AP or Evolved Node B (eNBs), provide wireless access within a coverage area or cell. In LTE, mobile devices, or mobile stations are referred to as user equipments (UE). LTE has included a number of improvements or developments.

5G New Radio (NR) development is part of a continued mobile broadband evolution process to meet the requirements of 5G, similar to earlier evolution of 3G & 4G wireless networks. In addition, 5G is also targeted at the new emerging use cases in addition to mobile broadband. A goal of 5G is to provide significant improvement in wireless performance, which may include new levels of data rate, latency, reliability, and security. 5G NR may also scale to efficiently connect the massive Internet of Things (IoT), and may offer new types of mission-critical services. Ultra-reliable and low-latency communications (URLLC) devices may require high reliability and very low latency.

SUMMARY

Various example implementations (or embodiments) are described and/or illustrated. The details of one or more examples of embodiments are set forth in the accompanying drawings and the description below. Other features will be apparent from the description and drawings, and from the claims.

A method, apparatus, and a computer-readable storage medium are provided for a machine learning (ML) model based radio resource management. In one example implementation, the method may include a network node defining a validity area and a measurement group for at least a ML model for one or more user equipments and transmitting the validity area and the measurement group of the at least one ML model to the user equipment.

In another example embodiment, the method may include a user equipment receiving a validity area and a measurement group of at least one ML model from a network node and performing measurements based at least on the measurement group.

DETAILED DESCRIPTION

Figure 1:
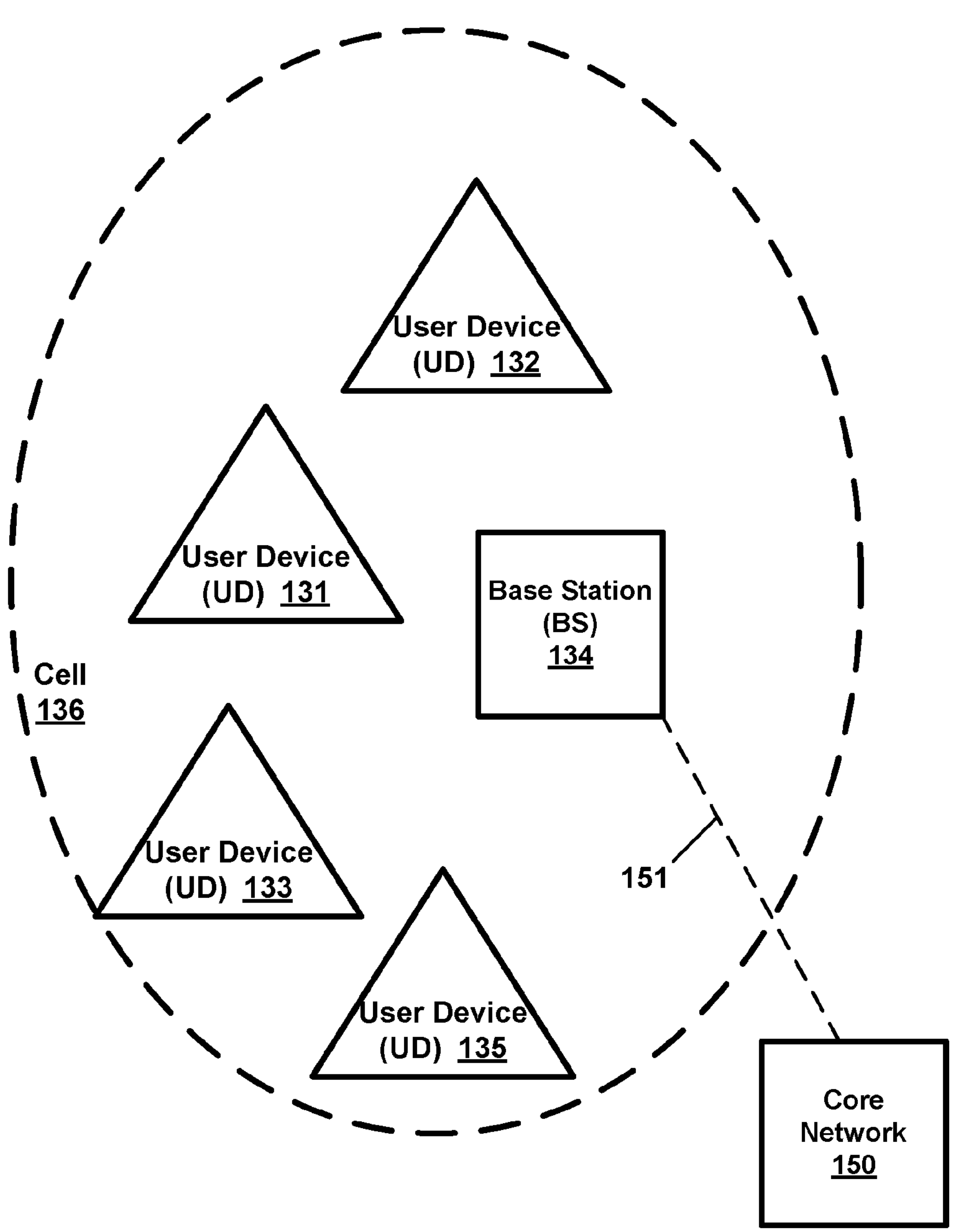
FIG. 1 is a block diagram of a wireless network according to an example embodiment.

FIG. 1 is a block diagram of a wireless network 130 according to an example embodiment. In the wireless network 130 of FIG. 1, user devices (UDs) 131, 132, 133 and 135, which may also be referred to as mobile stations (MSs) or user equipment (UEs), may be connected (and in communication) with a base station (BS) 134, which may also be referred to as an access point (AP), an enhanced Node B (eNB), a next-generation Node B (gNB) or a network node. At least part of the functionalities of an access point (AP), base station (BS), (e)Node B (eNB), or gNB may also be carried out by any node, server or host which may be operably coupled to a transceiver, such as a remote radio head. BS (or AP) 134 provides wireless coverage within a cell 136, including to user devices 131, 132, 133 and 135. Although only four user devices are shown as being connected or attached to BS 134, any number of user devices may be provided. BS 134 is also connected to a core network 150 via an interface 151. This is merely one simple example of a wireless network, and others may be used.

A user device (user terminal, user equipment (UE)) may refer to a portable computing device that includes wireless mobile communication devices operating with or without a subscriber identification module (SIM), including, but not limited to, the following types of devices: a mobile station (MS), a mobile phone, a cell phone, a smartphone, a personal digital assistant (PDA), a handset, a device using a wireless modem (alarm or measurement device, etc.), a laptop and/or touch screen computer, a tablet, a phablet, a game console, a notebook, and a multimedia device, as examples, or any other wireless device. It should be appreciated that a user device may also be a nearly exclusive uplink only device, of which an example is a camera or video camera loading images or video clips to a network.

In LTE (as an example), core network 150 may be referred to as Evolved Packet Core (EPC), which may include a mobility management entity (MME) which may handle or assist with mobility/handover of user devices between BSs, one or more gateways that may forward data and control signals between the BSs and packet data networks or the Internet, and other control functions or blocks.

In 5G/NR (as another example), the network architecture may be similar to that of LTE/LTE-Advanced. New functions are defined in 5G system architecture, including an access management function (AMF), a session management function (SMF), a user plane function (UPF), among other network functions in the next generation core (NGC) or 5G core (5GC). The 5G system may support new capabilities, including network slicing which may tailor networks to application requirements and provide virtual networks for tenants. cloud computing or data storage may also be utilized and node operations may be carried out, by a centralized unit (CU), at least partly, in a server, host, or node operationally coupled to distributed unit (DU), which may connect to a remote radio head (RRH). It may be also possible that node operations may be distributed among a plurality of servers, nodes, or hosts. The distribution of labor between core network operations and base station operations may differ from that of the LTE or may be non-existent. An example 5G core network 150 may include functional entities. The 5GC 150 may be connected using interface 151 to a UE via base stations 134 forming the next generation radio access network (NG-RAN). The CN may also include an access & mobility function (AMF) which may terminate the control plane interface with the RAN and may manage UE registrations and mobility. The CN may also include a user plane function (UPF) which may provide an anchor point for user Internet Protocol (IP), Ethernet, or Unstructured user data sessions. The UPF may be responsible for forwarding frames back and forth between a data network (DN) and gNBs through tunnels established over transport networks towards the UE(s) that want to exchange traffic with the DN. The UPF may be controlled by a session management function (SMF) that receives policies from a policy control function (PCF).

In addition, by way of illustrative example, the various example embodiments or techniques described herein may be applied to various types of user devices or data service types, or may apply to user devices that may have multiple applications running thereon that may be of different data service types. New Radio (5G) development may support a number of different applications or a number of different data service types, such as for example: machine type communications (MTC), enhanced machine type communication (eMTC), Internet of Things (IoT), and/or narrowband IoT user devices, enhanced mobile broadband (eMBB), and ultra-reliable and low-latency communications (URLLC).

IoT may refer to an ever-growing group of objects that may have Internet or network connectivity, so that these objects may send information to and receive information from other network devices. For example, many sensor type applications or devices may monitor a physical condition or a status, and may send a report to a server or other network device, e.g., when an event occurs. Machine Type Communications (MTC or machine to machine communications) may, for example, be characterized by fully automatic data generation, exchange, processing and actuation among intelligent machines, with or without intervention of humans. Enhanced mobile broadband (eMBB) may support much higher data rates than currently available in LTE.

Ultra-reliable and low-latency communications (URLLC) is a new data service type, or new usage scenario, which may be supported for New Radio (5G) systems. This enables emerging new applications and services, such as industrial automations, autonomous driving, vehicular safety, e-health services, and so on. 3GPP targets in providing up to e.g., 1 ms U-Plane (user/data plane) latency connectivity with 1-1e-5 reliability, by way of an illustrative example. Thus, for example, URLLC user devices/UEs may require a significantly lower block error rate than other types of user devices/UEs as well as low latency. Thus, for example, a URLLC UE (or URLLC application on a UE) may require much shorter latency, as compared to an eMBB UE (or an eMBB application running on a UE).

The various example embodiments may be applied to a wide variety of wireless technologies or wireless networks, such as LTE, LTE-A, 5G, IoT, MTC, eMTC, eMBB, URLLC, etc., or any other wireless network or wireless technology. These example networks, technologies or data service types are provided only as illustrative examples.

The complexity of a machine learning (ML) model can increase as a function of number of inputs and/or outputs. For example, in a machine learning model for predictive-mobility, the number of outputs is the number of candidate target cells. If the objective for the machine learning model is to learn some unique characteristics of the environment, then it is beneficial to have a local ML model trained with local data. For instance, cell borders relevant for a handover can depend on the geographical environment, e.g., buildings, vegetation, vehicles, carrier frequency, location of the antennas, radiation patterns, transmit power, etc., that interacts with propagation of the transmitted radio waves.

ML based radio resource management (RRM) algorithms may require a stream of input data for low latency prediction, for example, for mobility. In some embodiments, for example, input data for the handover may be, e.g., reference signal received power (RSRP) measurements from a set of cells, every 10 ms to −200 ms, and output may be handover prediction to another set of (pre-defined) cells. The input data may be any other network performance indicator (KPI), e.g., throughput, delay, reference signal received quality, block error rate, etc., metric or non-network performance metric, e.g., coordinates, speed, direction, trajectory, predicted trajectory, orientation, user plane activity, UE capability, etc. In an example embodiment, the UE may continuously measure and report the defined KPIs from the specific set of cells. When training the model, each input frame may be labelled with optimal cell to be connected to which may be based on offline estimation from the recorded data. After training, UE may continuously measure and report KPIs from the specific set of cells. The network may then use this information for predictive mobility handover with the trained ML model.

Therefore, handover decisions should be optimized considering unique radio propagation characteristics of each local area due to the above-mentioned reasons. A handover at the right time allows uninterrupted (or nearly uninterrupted) connectivity and can maintain the radio link 3GPP Release 16 (R16) conditional handover (CHO) feature can solve some of the issues with traditional handovers (e.g., too early HO, too late HO, HO to wrong cell, etc.), but the basic challenge of selecting and preparing the best target cell candidate(s) are still issues even with CHO.

A local area handover policy is difficult to find, especially if the rules for handover decisions are to be generalized because measurement of the environment includes hidden and time-variant states that cannot be fully measured with the information currently available in decision making. For instance, RSRP measurement values in one part of the network may denote a different situation in another part of the network due to geographical variations, e.g., intra/inter-frequency deployment, cell density, UE mobility profiles (e.g., speed), UE trajectories, etc.

Mobility Robustness Optimization (MRO) optimizes handover parameters per local area and for an average user profile (e.g., per cell and/or cell pair) since each cell has its own optimal parameters. This requires machine learning models to be local, for example, to learn and/or fingerprint unique local characteristics, not just according to average user profile.

This can lead to problems on how to organize data collection to support the specific requirements of machine learning based RRM in a local area. The current measurements are not able to collect data from specific network areas which would capture inter-cell and/or inter-frequency dependencies in the area that are needed for machine learning training and/or inference. For instance, UEs can measure and report N-strongest cells (where N is the number of cells to be reported). However, for training purposes, the measurements should be from specific cells in a specific area of the network. Moreover, the measurement configurations are per cell, while the measurement configuration should be valid for the specific area for which the machine learning model is trained and/or operational. Therefore, there is a need/desire for UEs to measure/report measurements from specific cells in a specific area of the network and/or measurement configuration being valid for a specific area for which a machine learning model is being used.

The present disclosure discloses a mechanism for a machine learning model based radio resource management. In an example embodiment, the mechanism describes a method that includes a network node defining a validity area and measurement group for a machine learning model for one or more user equipments and transmitting the validity area and measurement group of the at least one machine learning model to the user equipment. In some embodiments, the method may further include receiving measurements, from the UE, the measurements performed at the one or more user equipments based at least on the measurement group, and training the at least one machine learning model based at least on the received measurements. A UE may perform measurements of cells defined in a measurement group when the UE is connected to a cell defined in a validity area. A ML model may perform the inference inside the validity area.

In an additional example embodiment, the present disclosure describes another method that may include a user equipment receiving a validity area and measurement group of at least one machine learning model from a network node and performing measurements based at least on the measurement group.

Figure 2:
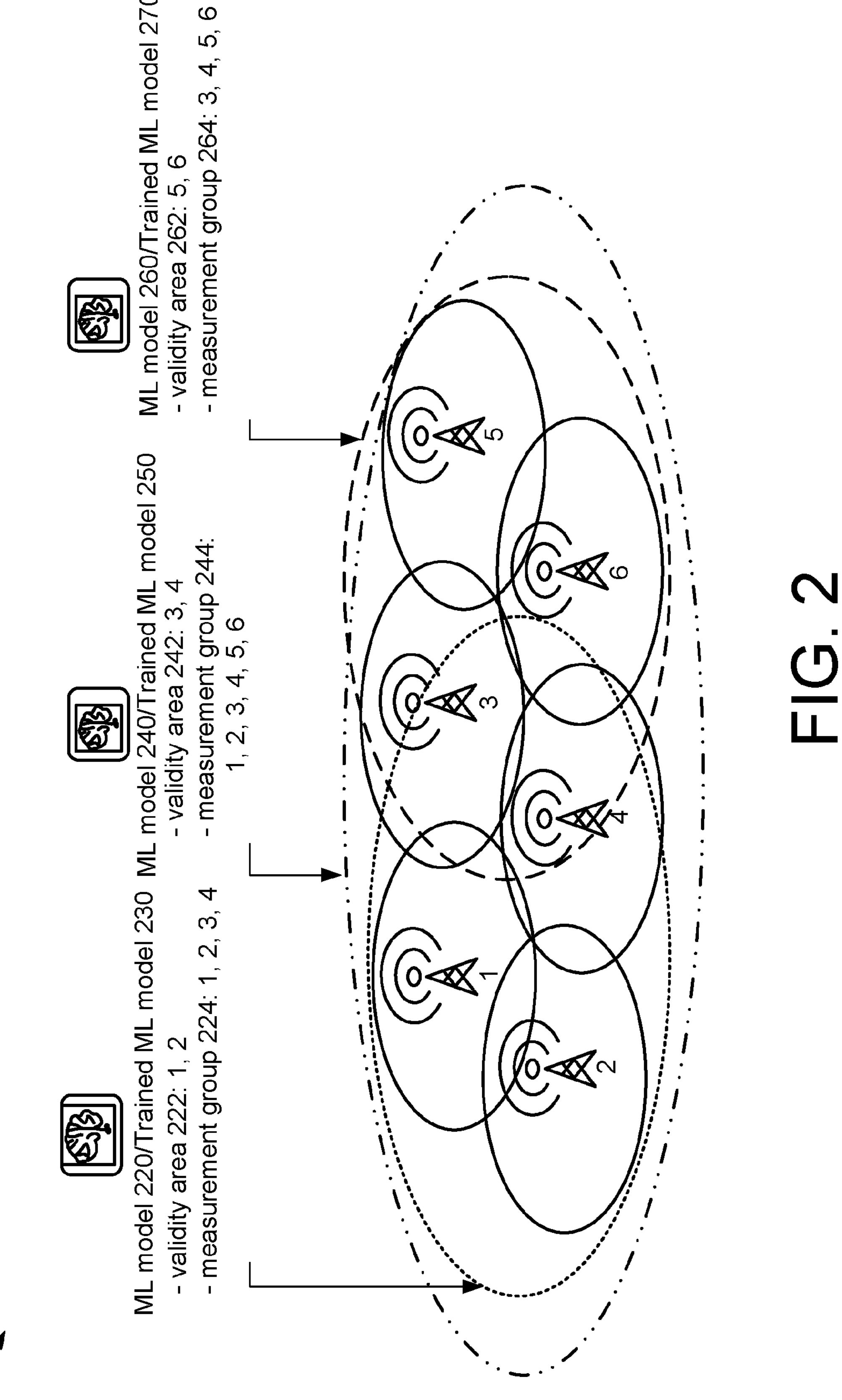
FIG. 2 is a block diagram illustrating machine learning area measurement configuration for machine learning model based radio resource management, according to an example embodiment.

FIG. 2 is a block diagram 200 illustrating machine learning area measurement configuration for machine learning model based radio resource management, according to an example embodiment.

In an example embodiment, FIG. 2 illustrates three machine learning models, e.g., ML models 220, 240, and 260. In some embodiments, for example, a network node, e.g., gNB (gNB 134 of FIG. 1), may define a validity area and a measurement group for one or more ML models. A validity area may generally define a list of one or more specific cells where cell specific measurements defined in a measurement group are applied. A measurement group may generally define cells where the specific measurements are collected. In some embodiments, for example, the validity area and measurement group may include a cell, a list of cells, a cell group ID, a list of cell group IDs, etc. In some embodiments, for example, the measurement group and validity area may be associated with a measurement object and a reporting configuration.

In an example embodiment, the network node may define a validity area 222 and a measurement group 224 for ML model 220. The validity area 222 may include cells 1 and 2, and measurement group 224 may include cells 1, 2, 3, and 4. In an additional example embodiment, the network node may define a validity area 242 and a measurement group 244 for ML model 240. The validity area 242 may include cells 3 and 4, and measurement group 244 may include cells 1, 2, 3, 4, 5, and 6. In another additional example embodiment, the network node may define a validity area 262 and a measurement group 264 for ML model 260. The validity area 262 may include cells 5 and 6, and measurement group 264 may include cells 3, 4, 5, and 6.

In addition, FIG. 2 demonstrates an example network 200 where the new elements of the measurement configuration are utilized to enable data collection for local area ML based RRM functions, e.g., a handover, where the handover is controlled by ML at network side based on UE RSRP measurements.

It should be noted that a configuration with a single ML model may not be an optimal solution because a network may include areas with different characteristics (e.g., propagation, buildings, streets, UE speeds and trajectories, etc.) and thus finding a solution that optimizes each neighbor cell relationship simultaneously becomes difficult and/or significantly increases complexity. Hence, handover performance may be enhanced by splitting a ML model to a plurality of local area ML model, e.g., three local area ML models as illustrated in FIG. 2, each optimizing the specific local problems based on local data. In some embodiments, the model may need to be split because the accuracy of a model decreases as function of inputs and outputs.

In some embodiments, a network node (e.g., a gNB) may transmit validity area and measurement group to a UE via a measurement configuration. Data collection for training and inference may be organized using the measurement configuration where validity area may define the cells for which one of the models may perform inference and the measurement group may define cells where specific measurements may be required by the model.

As illustrated in FIG. 2, the network may allow configuration of partially overlapping measurements between the ML models to have overlapping information, and thus enabling seamless mobility between the ML models. In an example embodiment, ML model 220 may execute handovers between cells 1 and 2 and measurements may be reported for cells 1, 2, 3, and 4. In an additional example embodiment, the UE may be handed over from cell 1 to cell 3 based on ML model 220, and then the UE may measure cells 1, 2, 3, 4, 5, and 6 while connected to cells 3 or 4.

In some embodiments, for example, the measurements performed by the UE may include one or more of: power/quality based on reference signal received power (RSRP), power/quality based on reference signal received quality (RSRQ), power/quality based on wideband channel quality indicator (CQI), power/quality based on indicated sub-band CQI, channel state information-reference signal (CSI-RS), synchronization signal block (SSB), channel block error ratio (BLER), and channel bit error probability (BEP).

The proposed mechanism provides several benefits which may include one or more of the following: i) the UE may report measurements of only the relevant cells instead of measurements of N strongest cells which may include irrelevant measurements (or irrelevant cells) and in addition skip some relevant measurements (e.g., cell not identified as one of the N best cells); ii) the UE may move inside the ML validity area without having to reconfigure the measurements each time; and/or iii) planning and configuration of specific ML deployment for RRM optimization is easier and enables lower complexity in training and running the ML model, and thereby reducing costs.

Figure 3:
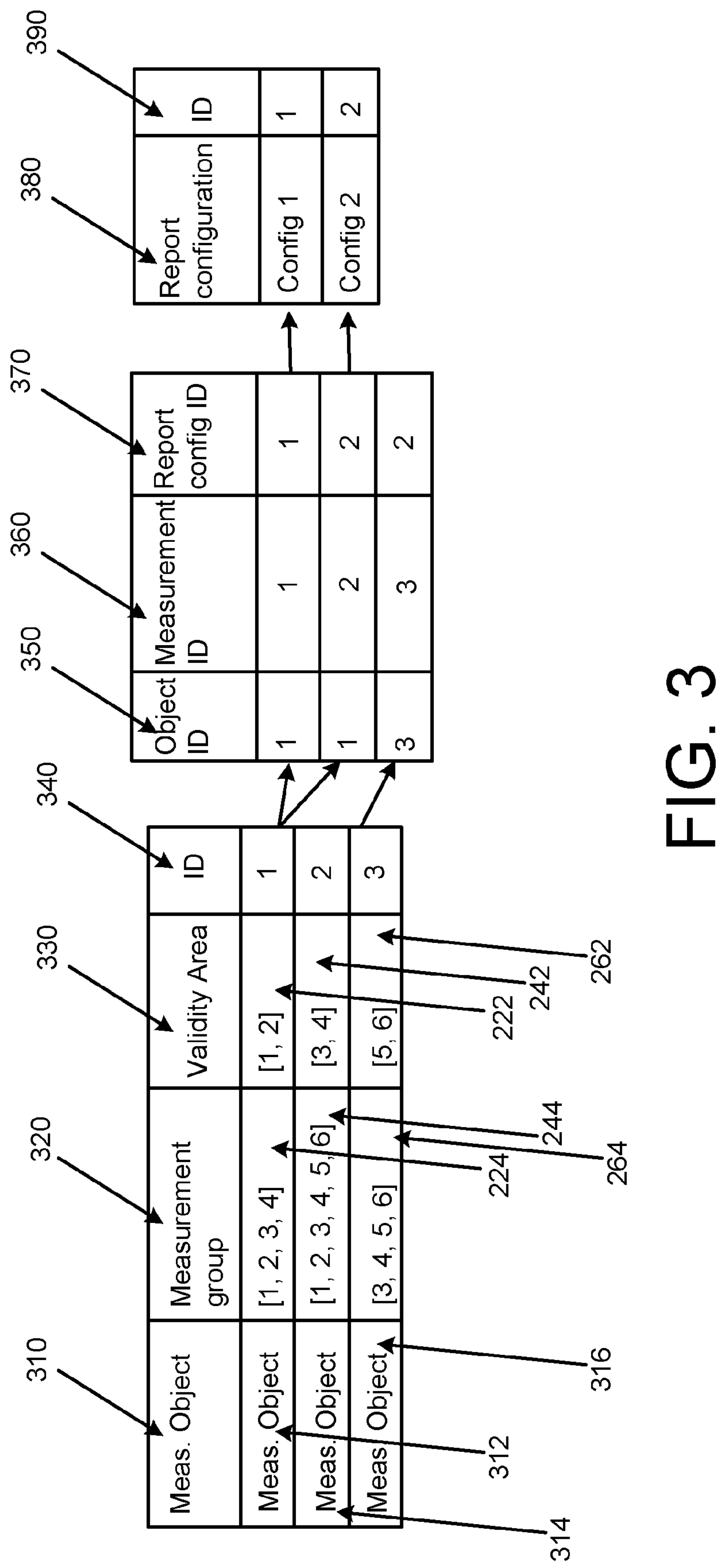
FIG. 3 illustrates a validity area and measurement group defined with a measurement object, according to an example embodiment.

FIG. 3 illustrates a validity area and measurement group defined with a measurement object 300, according to an example embodiment.

In some embodiments, for example, validity area 330 and measurement group 320 of a ML model (e.g., ML models 220, 240, and 260) may be defined with a measurement object 310 and the cell lists may be added to the corresponding information element (IE), measObjectIE.

In an example embodiment, validity area 222 and measurement group 224 of ML model 220 may be defined with a measurement object 312 (meas. object 312). In an additional example embodiment, validity area 242 and measurement group 244 of ML model 240 may be defined with a measurement object 314 (meas. object 314). In another additional example embodiment, validity area 262 and measurement group 264 of ML model 260 may be defined with a measurement object 316 (meas. object 316). In an example embodiment, measurement object and report configuration may be associated with a measurement ID. In this case, there may be no need for the report configuration associated with the measurement objects to contain the list of cells as the list of cells is already included in the measurement object. The validity area and measurement group may be defined in the meas. object and the reporting configuration applies inside the validity area of associated meas. object. For example, when a UE is connected to a cell defined in a validity area, the measurements may be performed for the cells defined in the measurement group of the validity area. When reporting configuration is associated with a measurement object and the validity area, the reporting may be triggered when the UE is connected to a cell defined in the validity area.

Figure 4:
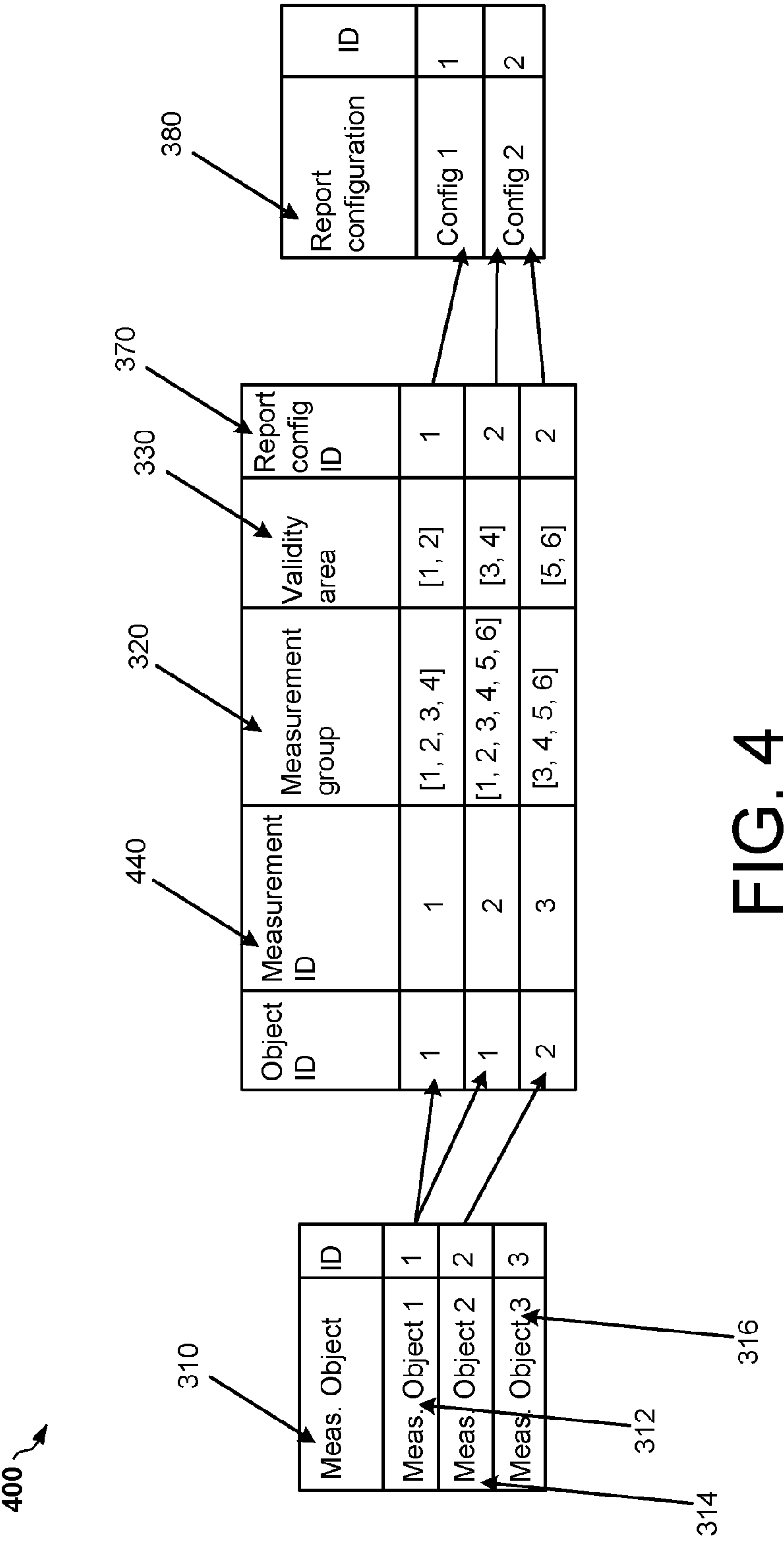
FIG. 4 illustrates a validity area and measurement group defined with a measurement ID, according to an example embodiment.

FIG. 4 illustrates a validity area and measurement group defined with a measurement ID 400, according to an example embodiment.

In some embodiments, for example, validity area 330 and measurement group 320 of a ML model (e.g., ML models 220, 240, and 260) may be defined with a measurement ID IE 440 where measurement object and reporting configuration are associated.

In an example embodiment, when a UE is connected to a cell defined in the validity area, for example, cell [1] of validity area 222, the measurements may be performed for the cells defined in the measurement group, for example, cells [1, 2, 3, 4] of measurement group 224. In an additional example embodiment, when reporting configuration is associated with validity area and measurement object, the reporting may be triggered only when UE is connected to a cell defined in the validity area. In some embodiments, if a certain cell defined in a measurement group cannot be measured, it may be reported with a predefined value indicating not-a-number (NaN) and/or that the cell was not detected.

Figure 5:
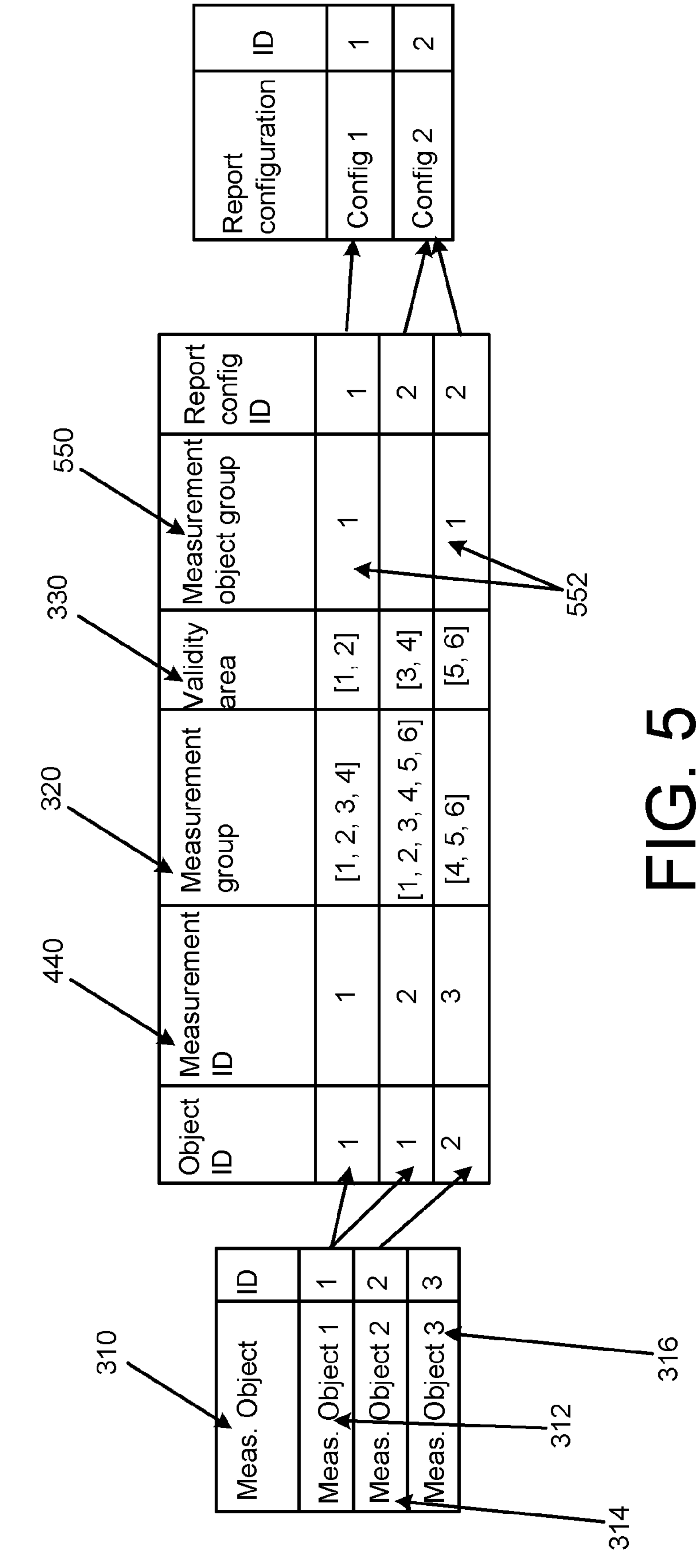
FIG. 5 illustrates measurement object groups for inter-frequency and inter-RAT configuration, according to an example embodiment.

FIG. 5 illustrates measurement object groups 500 for inter-frequency and inter-RAT configuration, according to an example embodiment.

In some embodiments, for example, measurement objects may be associated with a measurement object group 550. This may allow creation of validity areas and measurement groups across measurement objects, for example, measurement object group 552 across measurement groups 224 and 264. In some embodiments, for example, this may enable inter-frequency and/or inter-RAT configurations for validity areas and measurement groups by allowing the ML model to perform handovers between carrier frequencies and RATs, e.g., between LTE and NR.

In an example embodiment, when a UE is connected to a cell that is defined in validity area of a measurement object, and if the measurement object is part of measurement object group, then cell specific measurements (measurement group) of each measurement object defined in the measurement object group are performed and reported. For example, for Measurement ID=1, the UE may be connected to cell 1 which is in validity area of MeasObject 1. Since MeasObject 2 is also part of Measurement object group 1, the UE may measure cells 1 to 6 and the validity area may include cells [1, 2, 5, 6]. For Measurement ID=2, the MeasObject 1 is not part of Measurement object group and if the UE is connected to cell 3, the UE may measure cells 1 to 6, as described above.

Figure 6:
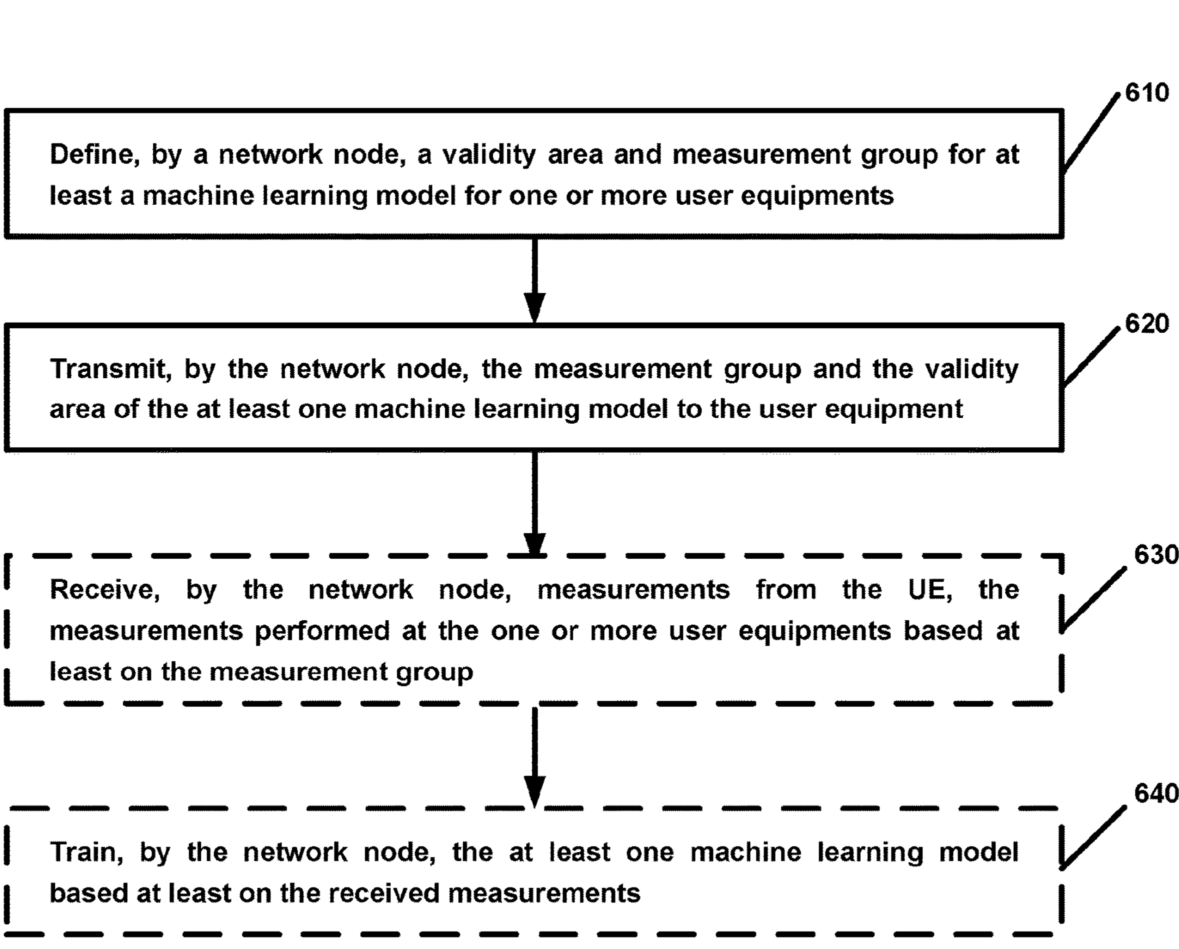
FIG. 6 is a flow chart illustrating a mechanism for machine learning (ML) model based radio resource management, according to an example embodiment.

FIG. 6 is a flow chart 600 illustrating a mechanism for machine learning (ML) model based radio resource management, according to an example embodiment.

At block 610, a network node (e.g., a gNB) may define a validity area and a measurement group for a machine learning model for one or more user equipments. In some embodiments, for example, as described earlier in reference to FIG. 2, the network node may define validity areas (222, 242, and 262) and measurement groups (224, 244, and 264) for ML models (220, 240, and 260), respectively. The validity areas 222, 242, and 262 may include cells 1 and 2; cells 3 and 4; and cells 5, and 6, respectively, for ML models 220, 240, and 260. The measurement groups 224, 244, and 264 may include cells 1, 2, 3, and 4; cells 1, 2, 3, 4, 5, and 6; and cells 3, 4, 5, and 6, respectively, for ML models 220, 240, and 260.

In some embodiments, for example, the ML models (220, 240, and 260) may for a UE. In some embodiments, for example, the ML models (220, 240, and 260) may be for a plurality (e.g., group, set, etc.) of UEs.

At block 620, the network node may transmit the measurement group and the validity area of the at least one machine learning model to the user equipment. In an example embodiment, the network node may transmit validity area 222 and measurement group 224 of ML model 220 to the UE. In another example embodiment, the network node may transmit validity area 242 and measurement group 244 of ML model 240 to the UE. In another additional example embodiment, the network node may transmit validity area 262 and measurement group 264 of ML model 260 to the UE.

In addition, in some embodiments, for example, the network node may transmit validity area and measurement group of at least one ML model to a plurality of UEs.

Optionally, at block 630, the network node may receive measurements from the UE. In some embodiments, for example, the network node may receive measurements from the UE that are performed at the UE (e.g., one or more UEs) based at least on the measurement group, for example, that is associated with the ML model. In an example embodiment, the network node may receive measurements performed at the UE for cells 1, 2, 3, and 4 for measurement group 224 for ML model 220. In an additional example embodiment, the network node may receive measurements performed at the UE for cells 1, 2, 3, 4, 5, and 6 for measurement group 244 for ML model 240. In another additional example embodiment, the network node may receive measurements performed at the UE for cells 3, 4, 5, and 6 for measurement group 264 for ML model 260.

Optionally, at block 640, the network node may train the at least one ML model based at least on the received measurements. For example, in some embodiments, the network node may train ML model 220 based at least on the measurements from measurement group 224, e.g., measurements performed by the UE for cells 1, 2, 3, and 4. In an additional example embodiment, the network node may train ML model 240 based at least on the measurements from measurement group 244, e.g., measurements performed by the UE for cells 1, 2, 3, 4, 5, and 6. In another additional example embodiment, the network node may train ML model 260 based at least on the measurements from measurement group 264, e.g., measurements performed by the UE for cells 3, 4, 5, and 6.

Optionally, in some embodiments, for example, the network node may perform one or more radio resource management (RRM) operations based at least on the trained model. In an example embodiment, the network node may perform a handover of a UE between cells 1 and 2 using ML model 220. In other words, the handover inside a validity area may be performed without reconfiguring of the measurement configuration. In an additional example embodiment, the network node may perform a handover of a UE from cell 1 to cell 3 using ML model 220, and after the handover, the measurement configuration may be reconfigured to use ML model 240. In another additional example embodiment, the network node may perform a handover of a UE from cell 3 to cell 5 using ML model 240.

Thus, a network node may use ML models trained based on relevant measurements may be used for efficiently performing RRM operations at the UE.

Additional example embodiments are described herein.

Figure 7:
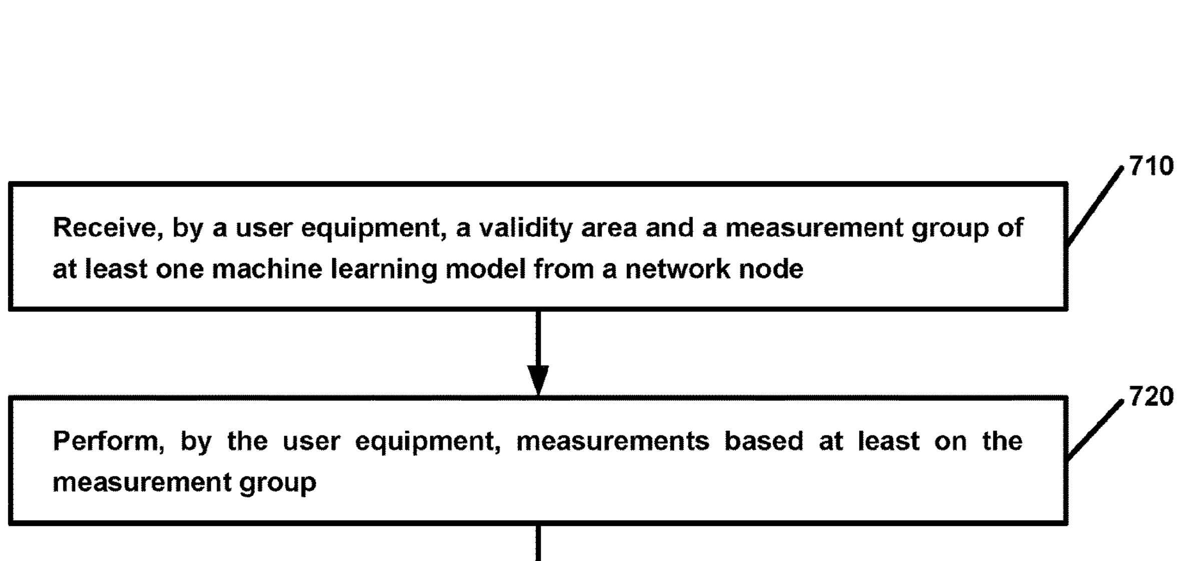
FIG. 7 is a flow chart illustrating another mechanism for machine learning based radio resource management, according to an additional example embodiment.

FIG. 7 is a flow chart 700 illustrating another mechanism for machine learning based radio resource management, according to an additional example embodiment.

At block 710, a user equipment may receive a validity area and measurement group of at least one machine learning model from a network node. In some embodiments, for example, the UE may receive validity area 222 and measurement group 224 for ML model 220 from the network node (e.g., a gNB). As described earlier in reference to FIGS. 2 and 6, the validity area 222 may include cells 1 and 2 and measurement group 224 may include cells 1, 2, 3, and 4. In an additional example embodiment, the UE may receive validity area 242 and measurement group 244 for ML model 240 from the network node. As described earlier in reference to FIGS. 2 and 6, the validity 242 area may include cells 3 and 4 and measurement group 244 may include cells 1, 2, 3, 4, 5, and 6. In another additional example embodiment, the UE may receive validity area 262 and measurement group 264 for ML model 260 from the network node. As described earlier in reference to FIGS. 2 and 6, the validity 262 area may include cells 5 and 6 and measurement group 264 may include cells 3, 4, 5, and 6.

In some embodiments, the UE may receive validity areas and measurement groups for a plurality of ML models, e.g., ML models, 220, 240, 260, etc. For example, the UE may receive validity areas (e.g., 222, 242, and 262) and measurement groups (e.g., 224, 244, and 264) for ML models 220, 240, and 260, respectively.

At block 720, the UE may perform measurements based at least on the measurement group. In some embodiments, for example, the UE may perform (e.g., collect) measurements based at least on the measurement group of the at least ML model received from the network node. In some embodiments, for example, the UE may perform measurements for cells 1, 2, 3, and 4 based at least on measurement group 224. In an additional example embodiment, the UE may perform measurements for cells 1, 2, 3, 4, 5, and 6 based at least on measurement group 244. In another additional example embodiment, the UE may perform measurements for cells 3, 4, 5, and 6 based at least on measurement group 264.

Optionally, at block 730, the UE may transmit the measurements to the network node. In some embodiments, the UE may transmit the measurements performed at the UE based on the measurement groups (e.g., measurement groups 224, 244, and/or 264) to the network node.

Optionally, in some embodiments, the UE may receive the at least one machine learning model from the network node. In some embodiments, for example, the UE may receive a trained ML model 230 that is trained based at least on the corresponding measurements (e.g., measurements performed by the UE based at least on measurement group 224) sent by the UE. It should be noted that trained ML model 230 may be obtained by training ML model 220. Similarly, trained ML model 250 may be obtained by training ML model 240 and trained ML model 270 may be obtained by the training ML model 260. In other words, as described earlier, the ML models may be trained at the network node based at least on the measurements received from the UE and the trained ML models may be sent to the UE so that the UE may use measurements at the UE as input to the trained ML model for inference for performing RRM operations at the UE. In some embodiments, the UE may receive ML models 220, 240, and 260 and train them at the UE. In some embodiments, the UE may receive trained ML models 230, 250, and 270 from the network node and train (re-train) them at the UE.

In some embodiments, the UE may perform one or more radio resource management operations based on at least one of measurements, the ML model, or the trained ML model. In some embodiments, for example, the UE may perform one or more RRM operations (e.g., handover, etc.) based at least on the trained ML models, e.g., 230, 250, and/or 270.

Thus, a UE may use trained ML models for efficiently performing RRM operations at the UE.

In some embodiments, the benefits of the above described embodiments may include the following: i) cell specific measurement group configurations in different parts of the network may allow ML based local RRM architecture with lower complexity and locally specific data labeling; ii) mobility between ML model areas is seamless and avoids ML related anomality (e.g., data cleaning not needed) when collecting enough measurements from cells with non-dominating UE trajectories (e.g., when reporting specific cells and not only the N best cells); iii) enables ML optimized mobility events per local area by configuring measurements representing all the potential target cell candidates for a mobility event and therefore, a trade-off-based optimization of mobility trigger events in radio network trying to optimize mobility procedures may not be needed; iv) improves the mobility robustness with a small overhead for configuring the measurements to specific cells; v) provides a novel way for configuring neighbor cell monitoring, enabling ML based customized procedure per UE at local scale, and minimizing the complexity and computing overhead of ML based mobility; vi) provides better understanding of cells that are potential candidates for conditional handover, cell reselection when applying the information of low activity states (inactive/idle), or for non-serving cell re-establishment; and vii) configure/de-configure ML area according to a UE mobility profile, for example, to differentiate stationary UEs from slow or high speed UEs and allows to define measurement configuration for several ML based RRM functions (handover, duplication, etc.).

Additional example embodiments are described herein.

Example 1. A method of communications, comprising: defining, by a network node, a validity area and a measurement group for at least a machine learning, ML, model for one or more user equipments; and transmitting, by the network node, the validity area and the measurement group of the at least one ML model to the user equipment.

Example 2. The method of Example 1, further comprising: receiving, by the network node, measurements from the UE, the measurements performed at the one or more user equipments based at least on the measurement group.

Example 3. The method of any of Examples 1-2, further comprising training the at least one ML model based at least on the received measurements.

Example 4. The method of any of Examples 1-3, further comprising: transmitting the at least one ML model or trained ML model to the user equipment.

Example 5. The method of any of Examples 1-4, further comprising: performing, by the network node, one or more radio resource management operations based on at least on the received measurements, the ML model, or the trained ML model.

Example 6. The method of any of Examples 1-5, wherein the validity area and/or the measurement group include a cell, a list of cells, a cell group ID, or cell group IDs.

Example 7. The method of any of Examples 1-6, wherein the validity area and the measurement group are transmitted via radio resource control signaling.

Example 8. The method of any of Examples 1-7, wherein the validity area and the measurement group are defined as a measurement object.

Example 9. The method of any of Examples 1-8, wherein a plurality of measurement objects is associated with a measurement-object group.

Example 10. The method of any of Examples 1-9, wherein the validity area and the measurement group are associated as a measurement ID.

Example 11. A method of communications, comprising: receiving, by a user equipment, a validity area and a measurement group of at least one machine learning, ML, model from a network node; and performing, by the user equipment, measurements based at least on the measurement group.

Example 12. The method of Example 11, further comprising: transmitting, by the user equipment, the measurements to the network node.

Example 13. The method of any of Examples 11-12, further comprising: receiving, by the user equipment, the at least one ML model.

Example 14. The method of any of Examples 11-13, wherein the received at least one ML model has been trained at the network node based at least on the measurements transmitted to the network node.

Example 15. The method of Examples 13 or 14, further comprising training, by the user equipment, the at least one ML model or the trained ML model based at least on the measurements.

Example 16. The method of any of Examples 11-15, further comprising: performing, by the user equipment, one or more radio resource management operations based on at least one of the measurements, the ML model, or the trained ML model.

Example 17. The method of any of Examples 11-16, wherein the validity area and the measurement group include a cell, a list of cells, a cell group ID, or cell group IDs.

Example 18. The method of any of Examples 11-17, wherein the validity area and the measurement group are received via radio resource control signaling.

Example 19. The method of any of Examples 11-18, wherein the validity area and the measurement group are received via a measurement object information element.

Example 20. The method of any of Examples 11-19, wherein a plurality of measurement objects is received as a measurement-object group.

Example 21. The method of any of Examples 11-20, wherein the validity area and the measurement group are defined as a measurement ID.

Example 22. The method of any of Examples 1-21, wherein the network node is a gNB.

Example 23. An apparatus comprising means for performing the method of any of Examples 1-22.

Example 24. A non-transitory computer-readable storage medium comprising instructions stored thereon that, when executed by at least one processor, are configured to cause a computing system to perform the method of any of Examples 1-22.

Example 25. An apparatus comprising: at least one processor; and at least one memory including computer program code; the at least one memory and the computer program code configured to, with the at least one processor, cause the apparatus at least to perform the method of any of Examples 1-22.

Example 25. An apparatus comprising: at least one processor; and at least one memory including computer program code; the at least one memory and the computer program code configured to, with the at least one processor, cause the apparatus at least to: define, by a network node, a validity area and a measurement group for at least a machine learning, ML, model for one or more user equipments; and transmit, by the network node, the validity area and the measurement group of the at least one ML model to the user equipment.

Example 26. The apparatus of Example 25, wherein the at least one memory and the computer program code are configured to, with the at least one processor, further cause the apparatus to: receive, by the network node, measurements from the UE, the measurements performed at the one or more user equipments based at least on the measurement group.

Example 27. The apparatus of any of Examples 25-26, wherein the at least one memory and the computer program code are configured to, with the at least one processor, further cause the apparatus to: train the at least one ML model based at least on the received measurements.

Example 28. The apparatus of any of Examples 25-27, wherein the at least one memory and the computer program code are configured to, with the at least one processor, further cause the apparatus to: transmit the at least one ML model or trained ML model to the user equipment.

Example 29. The apparatus of any of Examples 25-28, wherein the at least one memory and the computer program code are configured to, with the at least one processor, further cause the apparatus to: perform, by the network node, one or more radio resource management operations based on at least on the received measurements, the ML model, or the trained ML model.

Example 30. The apparatus of any of Examples 25-29, wherein the validity area and/or the measurement group include a cell, a list of cells, a cell group ID, or cell group IDs.

Example 31. The apparatus of any of Examples 25-30, wherein the validity area and the measurement group are transmitted via radio resource control signaling.

Example 32. The apparatus of any of Examples 25-31, wherein the validity area and the measurement group are defined as a measurement object.

Example 33. The apparatus of any of Examples 25-32, wherein a plurality of measurement objects is associated with a measurement-object group.

Example 34. The apparatus of any of Examples 25-33, wherein the validity area and the measurement group are associated as a measurement ID.

Example 35. An apparatus comprising: at least one processor; and at least one memory including computer program code; the at least one memory and the computer program code configured to, with the at least one processor, cause the apparatus at least to: receive, by a user equipment, a validity area and a measurement group of at least one machine learning, ML, model from a network node; and perform, by the user equipment, measurements based at least on the measurement group.

Example 36. The apparatus of Example 35, wherein the at least one memory and the computer program code are configured to, with the at least one processor, further cause the apparatus to: transmit, by the user equipment, the measurements to the network node.

Example 37. The apparatus of any of Examples 35-36, wherein the at least one memory and the computer program code are configured to, with the at least one processor, further cause the apparatus to: receive, by the user equipment, the at least one ML model.

Example 38. The apparatus of any of Examples 35-37, wherein the received at least one ML model has been trained at the network node based at least on the measurements transmitted to the network node.

Example 39. The apparatus of any of Examples 35-38, wherein the at least one memory and the computer program code are configured to, with the at least one processor, further cause the apparatus to: train, by the user equipment, the at least one ML model or the trained ML model based at least on the measurements.

Example 40. The apparatus of any of Examples 35-39, wherein the at least one memory and the computer program code are configured to, with the at least one processor, further cause the apparatus to: perform, by the user equipment, one or more radio resource management operations based on at least one of the measurements, the ML model, or the trained ML model.

Example 41. The apparatus of any of Examples 35-40, wherein the validity area and the measurement group include a cell, a list of cells, a cell group ID, or cell group IDs.

Example 42. The apparatus of any of Examples 35-41, wherein the validity area and the measurement group are received via radio resource control signaling.

Example 43. The apparatus of any of Examples 35-42, wherein the validity area and the measurement group are received via a measurement object information element.

Example 44. The apparatus of any of Examples 35-43, wherein a plurality of measurement objects is received as a measurement-object group.

Example 45. The apparatus of any of Examples 35-44, wherein the validity area and the measurement group are defined as a measurement ID.

Example 46. The apparatus of any of Examples 35-44, wherein the network node is a gNB.

Figure 8:
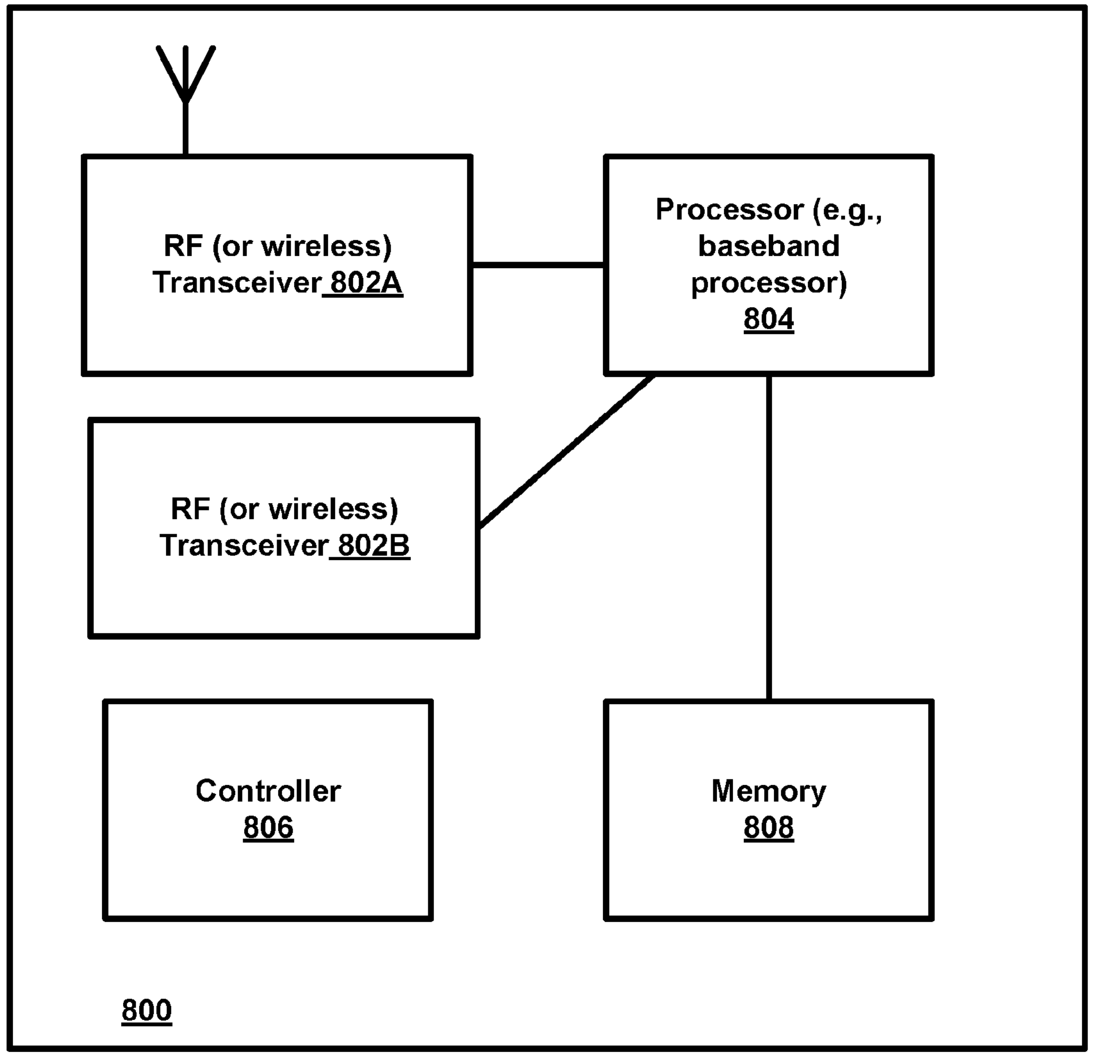
FIG. 8 is a block diagram of a node or wireless station (e.g., base station/access point or mobile station/user device/UE), according to an example embodiment.

FIG. 8 is a block diagram of a wireless station (e.g., user equipment (UE)/user device or AP/gNB/MgNB/SgNB) 800 according to an example embodiment. The wireless station 800 may include, for example, one or more RF (radio frequency) or wireless transceivers 802A, 802B, where each wireless transceiver includes a transmitter to transmit signals and a receiver to receive signals. The wireless station also includes a processor or control unit/entity (controller) 804/806 to execute instructions or software and control transmission and receptions of signals, and a memory 808 to store data and/or instructions.

Processor 804 may also make decisions or determinations, generate frames, packets or messages for transmission, decode received frames or messages for further processing, and other tasks or functions described herein. Processor 804, which may be a baseband processor, for example, may generate messages, packets, frames or other signals for transmission via wireless transceiver 802 (802A or 802B). Processor 804 may control transmission of signals or messages over a wireless network, and may control the reception of signals or messages, etc., via a wireless network (e.g., after being down-converted by wireless transceiver 802, for example). Processor 804 may be programmable and capable of executing software or other instructions stored in memory or on other computer media to perform the various tasks and functions described above, such as one or more of the tasks or methods described above. Processor 804 may be (or may include), for example, hardware, programmable logic, a programmable processor that executes software or firmware, and/or any combination of these. Using other terminology, processor 804 and transceiver 802 together may be considered as a wireless transmitter/receiver system, for example.

In addition, referring to FIG. 8, a controller (or processor) 806 (804) may execute software and instructions, and may provide overall control for the station 800, and may provide control for other systems not shown in FIG. 8, such as controlling input/output devices (e.g., display, keypad), and/or may execute software for one or more applications that may be provided on wireless station 800, such as, for example, an email program, audio/video applications, a word processor, a Voice over IP application, or other application or software. Moreover, a storage medium may be provided that includes stored instructions, which when executed by a controller or processor may result in the processor 804, or other controller or processor, performing one or more of the functions or tasks described above.

According to another example embodiment, RF or wireless transceiver(s) 802A/802B may receive signals or data and/or transmit or send signals or data. Processor 804 (and possibly transceivers 802A/802B) may control the RF or wireless transceiver 802A or 802B to receive, send, broadcast or transmit signals or data.

The aspects are not, however, restricted to the system that is given as an example, but a person skilled in the art may apply the solution to other communication systems. Another example of a suitable communications system is the 5G concept. It is assumed that network architecture in 5G will be quite similar to that of the LTE-advanced. 5G is likely to use multiple input—multiple output (MIMO) antennas, many more base stations or nodes than the LTE (a so-called small cell concept), including macro sites operating in co-operation with smaller stations and perhaps also employing a variety of radio technologies for better coverage and enhanced data rates.

It should be appreciated that future networks will most probably utilize network functions virtualization (NFV) which is a network architecture concept that proposes virtualizing network node functions into "building blocks" or entities that may be operationally connected or linked together to provide services. A virtualized network function (VNF) may comprise one or more virtual machines running computer program codes using standard or general type servers instead of customized hardware. Cloud computing or data storage may also be utilized. In radio communications this may mean node operations may be carried out, at least partly, in a server, host or node operationally coupled to a remote radio head. It is also possible that node operations will be distributed among a plurality of servers, nodes or hosts. It should also be understood that the distribution of labor between core network operations and base station operations may differ from that of the LTE or even be non-existent.

Embodiments of the various techniques described herein may be implemented in digital electronic circuitry, or in computer hardware, firmware, software, or in combinations of them. Embodiments may be implemented as a computer program product, i.e., a computer program tangibly embodied in an information carrier, e.g., in a machine-readable storage device or in a propagated signal, for execution by, or to control the operation of, a data processing apparatus, e.g., a programmable processor, a computer, or multiple computers. Embodiments may also be provided on a computer readable medium or computer readable storage medium, which may be a non-transitory medium. Embodiments of the various techniques may also include implementations provided via transitory signals or media, and/or programs and/or software implementations that are downloadable via the Internet or other network(s), either wired networks and/or wireless networks. In addition, embodiments may be provided via machine type communications (MTC), and also via an Internet of Things (IOT).

The computer program may be in source code form, object code form, or in some intermediate form, and it may be stored in some sort of carrier, distribution medium, or computer readable medium, which may be any entity or device capable of carrying the program. Such carriers include a record medium, computer memory, read-only memory, photoelectrical and/or electrical carrier signal, telecommunications signal, and software distribution package, for example. Depending on the processing power needed, the computer program may be executed in a single electronic digital computer or it may be distributed amongst a number of computers.

Furthermore, embodiments of the various techniques described herein may use a cyber-physical system (CPS) (a system of collaborating computational elements controlling physical entities). CPS may enable the embodiment and exploitation of massive amounts of interconnected ICT devices (sensors, actuators, processors microcontrollers, . . . ) embedded in physical objects at different locations. Mobile cyber physical systems, in which the physical system in question has inherent mobility, are a subcategory of cyber-physical systems. Examples of mobile physical systems include mobile robotics and electronics transported by humans or animals. The rise in popularity of smartphones has increased interest in the area of mobile cyber-physical systems. Therefore, various embodiments of techniques described herein may be provided via one or more of these technologies.

A computer program, such as the computer program(s) described above, can be written in any form of programming language, including compiled or interpreted languages, and can be deployed in any form, including as a stand-alone program or as a module, component, subroutine, or other unit or part of it suitable for use in a computing environment. A computer program can be deployed to be executed on one computer or on multiple computers at one site or distributed across multiple sites and interconnected by a communication network.

Method steps may be performed by one or more programmable processors executing a computer program or computer program portions to perform functions by operating on input data and generating output. Method steps also may be performed by, and an apparatus may be implemented as, special purpose logic circuitry, e.g., an FPGA (field programmable gate array) or an ASIC (application specific integrated circuit).

Processors suitable for the execution of a computer program include, by way of example, both general and special purpose microprocessors, and any one or more processors of any kind of digital computer, chip or chipset. Generally, a processor will receive instructions and data from a read only memory or a random access memory or both. Elements of a computer may include at least one processor for executing instructions and one or more memory devices for storing instructions and data. Generally, a computer also may include, or be operatively coupled to receive data from or transfer data to, or both, one or more mass storage devices for storing data, e.g., magnetic, magneto optical disks, or optical disks. Information carriers suitable for embodying computer program instructions and data include all forms of non volatile memory, including by way of example semiconductor memory devices, e.g., EPROM, EEPROM, and flash memory devices; magnetic disks, e.g., internal hard disks or removable disks; magneto optical disks; and CD ROM and DVD-ROM disks. The processor and the memory may be supplemented by, or incorporated in, special purpose logic circuitry.

The invention claimed is:

1. An apparatus comprising:

at least one processor; and at least one memory including computer program code;

the at least one memory and the computer program code configured to, with the at least one processor, cause the apparatus at least to:

define a validity area and a measurement group for at least a machine learning, ML, model for one or more user equipments, wherein the validity area comprises one or more cells in which the at least one ML model performs inference; and transmit the validity area and the measurement group of the at least one ML model to a user equipment of the one or more user equipments via radio resource control (RRC) signaling, wherein the validity area and the measurement group are transmitted via a measurement object information element, wherein the at least one memory and the computer program code are configured to, with the at least one processor, further cause the apparatus to:

receive measurements from the user equipment, the measurements performed at the user equipment based at least on the measurement group, when the user equipment is connected to a cell included in the validity area;

train the at least one ML model based at least on the received measurements;

perform one or more radio resource management operations based on at least one of the received measurements, the ML model, or the trained ML model;

transmit the at least one ML model or a trained ML model to the user equipment, wherein at least one of the validity area or the measurement group include a cell, a list of cells, a cell group ID, or cell group IDs, wherein a plurality of measurement objects is associated with a measurement-object group, the measurement-object group enabling inter-frequency or inter-radio access technology (RAT) configurations for the validity area and the measurement group, wherein the apparatus is a gNB.

2. An apparatus comprising:

at least one processor; and at least one memory including computer program code;

the at least one memory and the computer program code configured to, with the at least one processor, cause the apparatus at least to:

receive a validity area and a measurement group of at least one machine learning, ML, model from a network node via radio resource control (RRC) signaling, wherein the validity area comprises one or more cells in which the at least one ML model performs inference, wherein the validity area and the measurement group are received via a measurement object information element;

perform measurements based at least on the measurement group, when the apparatus is connected to a cell included in the validity area, wherein the measurement group defines cells where measurements are required by the at least one ML model, wherein the measurement group comprises at least one cell which is not comprised within the validity area;

for a cell defined in the measurement group that cannot be measured, report a predefined value indicating not-a-number (NaN) or that the cell was not detected;

receive a plurality of measurement objects as a measurement-object group, the measurement-object group enabling inter-frequency or inter-radio access technology (RAT) configurations for the validity area and the measurement group, wherein, when the apparatus is connected to a cell defined in the validity area of a measurement object that is part of the measurement-object group, cell specific measurements of each measurement object defined in the measurement-object group are performed and reported;

transmit the measurements to the network node;

receive the at least one ML model, wherein the received at least one ML model has been trained at the network node based at least on the measurements transmitted to the network node; and perform one or more radio resource management operations based on at least one of the measurements, the ML model, or the trained ML model.

3. The apparatus of claim 2, wherein the measurements performed by the apparatus include: power/quality based on reference signal received power (RSRP), power/quality based on reference signal received quality (RSRQ), power/quality based on wideband channel quality indicator (CQI), power/quality based on indicated sub-band CQI, channel state information-reference signal (CSI-RS), synchronization signal block (SSB), channel block error ratio (BLER), and channel bit error probability (BEP).

4. The apparatus of claim 2, wherein the at least one memory and the computer program code are configured to, with the at least one processor, further cause the apparatus to:

train the at least one ML model or the trained ML model based at least on the measurements.

5. The apparatus of claim 2, wherein at least one of the validity area or the measurement group include a cell, a list of cells, a cell group ID, or cell group IDs.

6. The apparatus of claim 2, wherein the apparatus receives validity areas and measurement groups for a plurality of ML models, wherein measurement groups of the plurality of ML models partially overlap to enable seamless mobility between validity areas associated with the plurality of ML models.

7. The apparatus of claim 6, wherein the one or more radio resource management operations comprise a handover within the validity area, and wherein the handover within the validity area is performed without reconfiguring the measurement group.

8. The apparatus of claim 2, wherein a reporting configuration is associated with the measurement object information element and the validity area, and measurement reporting is triggered only when the apparatus is connected to a cell defined in the validity area.

9. The apparatus of claim 8, wherein the at least one memory and the computer program code are configured to, with the at least one processor, further cause the apparatus to:

use the measurements performed based on the measurement group as input to the trained ML model for inference at the apparatus to perform the one or more radio resource management operations.

10. The apparatus of claim 2, wherein the validity area and the measurement group are defined as a measurement ID.

11. The apparatus of claim 2, wherein the network node is a gNB.

12. A method, comprising:

receiving, by a user equipment, a validity area and a measurement group of at least one machine learning, ML, model from a network node via radio resource control (RRC) signaling, wherein the validity area comprises one or more cells in which the at least one ML model performs inference, and wherein the validity area and the measurement group are received via a measurement object information element;

performing, by the user equipment, measurements based at least on the measurement group, when the user equipment is connected to a cell included in the validity area, wherein the measurement group defines cells where measurements are required by the at least one ML model, wherein the measurement group comprises at least one cell which is not comprised within the validity area;

for a cell defined in the measurement group that cannot be measured, reporting, by the user equipment, a predefined value indicating not-a-number (NaN) or that the cell was not detected;

receiving, by the user equipment, a plurality of measurement objects as a measurement-object group, the measurement-object group enabling inter-frequency or inter-radio access technology (RAT) configurations for the validity area and the measurement group, wherein, when the user equipment is connected to a cell defined in the validity area of a measurement object that is part of the measurement-object group, cell specific measurements of each measurement object defined in the measurement-object group are performed and reported;

transmitting, by the user equipment, the measurements to the network node;

receiving, by the user equipment, the at least one ML model, wherein the received at least one ML model has been trained at the network node based at least on the measurements transmitted to the network node; and performing, by the user equipment, one or more radio resource management operations based on at least one of the measurements, the ML model, or the trained ML model.

13. The method of claim 12, wherein the measurements performed by the user equipment include: power/quality based on reference signal received power (RSRP), power/quality based on reference signal received quality (RSRQ), power/quality based on wideband channel quality indicator (CQI), power/quality based on indicated sub-band CQI, channel state information-reference signal (CSI-RS), synchronization signal block (SSB), channel block error ratio (BLER), and channel bit error probability (BEP).

14. The method of claim 12, further comprising: training, by the user equipment, the at least one ML model or the trained ML model based at least on the measurements.

15. The method of claim 12, wherein the user equipment receives validity areas and measurement groups for a plurality of ML models, wherein measurement groups of the plurality of ML models partially overlap to enable seamless mobility between validity areas associated with the plurality of ML models.

16. The method of claim 15, wherein the one or more radio resource management operations comprise a handover within the validity area, and wherein the handover within the validity area is performed without reconfiguring the measurement group.

17. The method of claim 12, wherein a reporting configuration is associated with the measurement object information element and the validity area, and measurement reporting is triggered only when the user equipment is connected to a cell defined in the validity area.

18. The method of claim 17, further comprising:

using, by the user equipment, the measurements performed based on the measurement group as input to the trained ML model for inference at the user equipment to perform the one or more radio resource management operations.

19. The method of claim 12, wherein the validity area and the measurement group are defined as a measurement ID.

20. The method of claim 12, wherein the network node is a gNB.

* * * * *